United States Patent
Ataka

[15] 3,656,421
[45] Apr. 18, 1972

[54] VIEWFINDER OPTICAL SYSTEM
[72] Inventor: Hisanori Ataka, Kawasaki, Japan
[73] Assignee: Kabushiki Kaisha Ricoh
[22] Filed: Feb. 26, 1970
[21] Appl. No.: 14,289

[30] Foreign Application Priority Data
Feb. 28, 1969  Japan..................................44/15572

[52] U.S. Cl..................................................95/42
[51] Int. Cl.................................................G03b 19/12
[58] Field of Search.......................................95/42

[56] References Cited

UNITED STATES PATENTS

| | | | |
|---|---|---|---|
| 3,127,809 | 4/1964 | Denk | 95/42 X |
| 2,323,005 | 6/1943 | Bertele | 95/42 X |
| 2,252,640 | 8/1941 | Nuchterlein | 95/42 |
| 3,468,233 | 9/1969 | Schmidt | 95/42 |
| 3,103,150 | 9/1963 | Lange | 95/42 X |

FOREIGN PATENTS OR APPLICATIONS 508,396  1/1955  Italy..........................................95/42

Primary Examiner—John M. Horan
Assistant Examiner—Michael Harris
Attorney—Burgess, Ryan & Wayne

[57] ABSTRACT

A viewfinder optical system comprising a semi-transparent mirror disposed backwardly and obliquely of an image forming lens, an image forming plane and a directional or reflextive screen disposed at conjugated positions with respect to said semi-transparent mirror and an optical system for viewing through said semi-transparent mirror an image formed upon said directional or reflexive screen.

5 Claims, 4 Drawing Figures

PATENTED APR 18 1972 3,656,421

VIEWFINDER OPTICAL SYSTEM

BACKGROUND OF THE INVENTION

The present invention relates to an optical system of a viewfinder and more particularly a viewfinder optical system for cameras and projectors.

In order to view an erect image of an image formed upon a ground glass or screen, the prior art generally uses a penta-roof type prism or a combination of a plurality of reflecting mirrors. Therefore, the viewfinder optical system of the prior art is complicated in construction and very expensive.

SUMMARY OF THE INVENTION

The present invention provides a viewfinder optical system in which a sensitized member and a directional or reflexive screen are disposed at conjugated positions with respect to a semi-transparent mirror which in turn is disposed backwardly of a photo lens and obliquely of the optical axis thereof so that an image formed upon the directional or reflexive screen may be viewed through the semi-transparent mirror.

The novel feature which is characteristic of the present invention is that the directional or reflexive screen is used as a ground glass and an image formed upon the directional or reflexive screen is viewed through an eyepiece as an enlarged, erect real image.

According to one embodiment of the present invention, the viewfinder optical system is so arranged that an image of a subject may be viewed through an eyepiece in the direction parallel with the optical axis of the photo lens or "at eye level" while in another embodiment of the present invention the viewfinder optical system is so arranged that the image of a subject may be viewed at a right angle relative to the optical axis of the photo lens or "at waist level".

Many advantages may be accrued from the present invention as will be described below. The light reflected by the ground glass screen is directional or reflexive so that an image of a relatively higher luminance may be viewed even though a semi-transparent mirror is used. A real image forming lens disposed on the side of the semi-transparent mirror opposite to the directional or reflexive screen may have an effective diameter smaller than that of the photo lens so that the present invention encourages much freedom in camera design. In the conventional viewfinder system, a penta-roof type mirror or a combination of a plurality of reflecting mirrors is used in order to form an erect image of the image formed upon the ground glass, but in accordance with the present invention, only two reflecting mirrors of relatively small size are used. Furthermore, one of the two reflecting mirrors may be so arranged as to be retracted from the optical system so that the viewfinder system may be readily converted into a "waist-level" viewfinder. A single-lens reflex camera to which the present invention is applied can be made more compact in size and light in weight as compared with the conventional camera.

DESCRIPTION OF THE PREFERRED EMBODIMENTS

The present invention will be described as being applied to a single-lens reflex camera.

Figure 4:
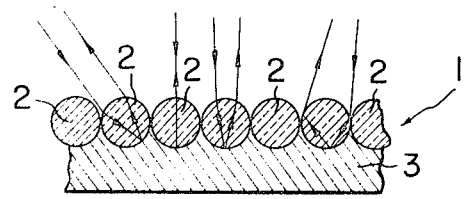
FIG. 4 is a fragmentary sectional view, on enlarged scale, of a directional or reflexive screen which is used as a ground glass in accordance with the present invention.

As best shown in FIG. 4, a directional or reflexive screen 1 consists of a multiplicity of small glass beads 2 which have a suitable refractive index and are overlaid upon a light reflecting material base 3 in such a manner that glass beads 2 may not be overlaid one upon another. The light incident upon the directional or reflexive screen is reflected upon the spherical surface of each of the glass beads in contact with the base 3 so that the reflected light is directed in substantially the same direction in which the light is incident upon the screen. Therefore, an image having a relatively higher luminance may be observed from a relatively confined area adjacent to the light source from which the light is projected upon the screen.

Figure 1:
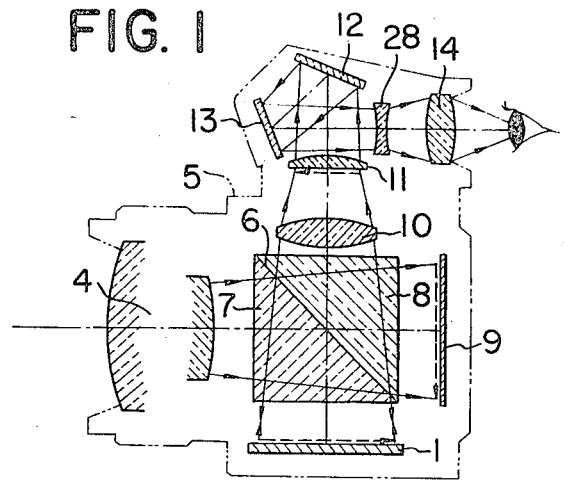
FIG. 1 is a sectional view illustrating only the optical system of a single-lens reflex camera to which the present invention is applied in one form.

Referring to FIG. 1, reference numeral 4 designates a photo lens of a single-lens reflex camera whose outer configuration is indicated by the chain line 5; and 6, a semi-transparent mirror disposed upon the interface between two right-angle prisms 7 and 8. The directional or reflexive screen 1 and a sensitized member 9 are placed at conjugated positions with respect to the semi-transparent mirror 6 so that the images are formed by the photo lens 4 upon the screen 1 and upon the sensitized member 9. A real image forming lens 10 having a suitable focal length is disposed on one side of the semi-transparent mirror 6 opposite to the screen 1 and a field lens 11 is positioned at the focal point of the real image forming lens 10. An image formed by the lens 10 can be viewed as an erect image through an eyepiece 14 and two flat or planar mirrors 12 and 13 which are so arranged as to orient the optical axis of the lens 10 to the eyepiece.

Figure 2:
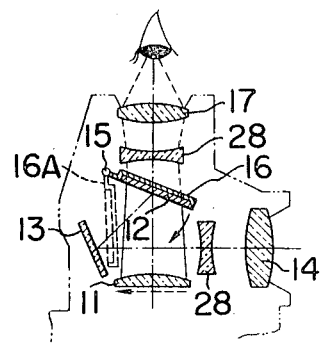
FIG. 2 is a sectional view of another embodiment of the present invention illustrating only major components of a viewfinder.

When the mirror 12 is removed from the optical system and when the eyepiece is positioned upwardly of the field lens 11 the real image may be viewed from the upper side of the camera. This arrangement is illustrated in FIG. 2 in which the mirror 12 is securely fixed to a frame 16 which in turn is rotatably fixed to a stationary member by means of a shaft 15 extending along the front side edge of the mirror 12. The frame 16 may be rotated by an operation from the exterior of the camera from the reflecting position indicated by the solid line to a non-reflecting position indicated by the broken line 16A. When the mirror 12 is placed in the non-reflecting position 16A, the erect image of a subject focused upon the field lens 11 may be viewed through an eyepiece 17.

Figure 3:
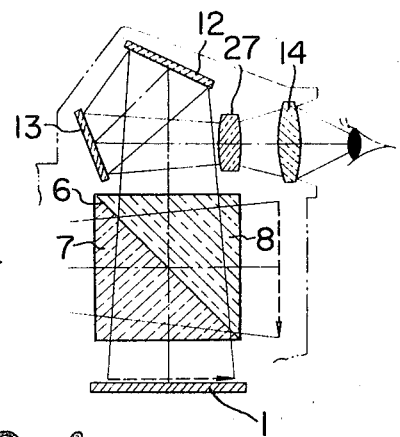
FIG. 3 is a sectional view of a third embodiment of the present invention.

FIG. 3 illustrates another embodiment of the present invention in which the field lens 11 is eliminated and a real image forming lens 27 is positioned forwardly of the eyepiece 14. This arrangement has one advantage that the camera can be made compact in size especially in the direction of its height. A bioconcave lens 28 positioned in front of the eyepiece 14 in the optical system shown in FIG. 1 or 2 serves to reduce the diameter of the light bundle between the field lens 11 and the eyepiece 14 so that the mirrors 12 and 13 interposed between the field lens 11 and the eyepiece 14 may be reduced in size.

The present invention has been so far described in detail as being applied to the single-lens reflex cameras, but it will be readily understood that an optical projection system may be provided when the sensitized member 9 in FIG. 1 is eliminated while an image formed there is projected upon a suitable screen.

I claim:

1. A viewfinder optical system for a camera comprising
   a photo lens located on the optical axis of the camera;
   a pair of right-angled prisms located on the optical axis adjacent said photo lens, said prisms having an abutting interface disposed obliquely to the optical axis;
   a semi-transparent mirror disposed on said interface;
   a reflexive screen located in a plane spaced from a side of one of said prisms;
   a sensitized member located in a plane spaced from a side of the other prism;
   the plane of said member being generally perpendicular to the optical axis passing through said photo lens, and the plane of said screen being generally parallel to the optical axis passing through said photo lens;
   said member and said screen each forming an angle with respect to said oblique interface, and said member and said screen being located at conjugated positions with respect to said oblique interface so that said angles are equal;

an eyepiece located on the optical axis on the side of said prisms opposite to the location of said screen; and a real image forming lens and a plurality of reflecting mirrors located on the optical axis between said prisms and said eyepiece.

2. A viewfinder according to claim 1 in which said real image forming lens is disposed adjacent said prisms, and said reflecting mirrors are disposed adjacent said eyepiece to direct the image for eye-level viewing.

3. A viewfinder according to claim 1 in which at least one of said mirrors is mounted to be pivoted out of the optical axis thereby allowing the image to be directed from said prisms for waist-level viewing.

4. A viewfinder according to claim 1 in which said real image forming lens is positioned between said reflecting mirrors and said eyepiece.

5. A viewfinder according to claim 4 in which a biconcave lens is located between said reflecting mirrors and said eyepiece.

* * * * *